United States Patent
Prater (10) Patent No.: US 11,584,471 B2
(45) Date of Patent: Feb. 21, 2023

(54) QUICK-FLIP BICYCLE HEADTUBE COMPONENT

(71) Applicant: Jim Prater, Calhoun, GA (US)

(72) Inventor: Jim Prater, Calhoun, GA (US)

( * ) Notice: Subject to any disclaimer, the term of this patent is extended or adjusted under 35 U.S.C. 154(b) by 119 days.

(21) Appl. No.: 16/591,557

(22) Filed: Oct. 2, 2020

(65) Prior Publication Data
US 2021/0031864 A1 Feb. 4, 2021

Related U.S. Application Data

(60) Provisional application No. 62/739,867, filed on Oct. 2, 2018.

(51) Int. Cl.
*B62K 21/06* (2006.01)
*B62K 19/32* (2006.01)
*B62K 21/02* (2006.01)

(52) U.S. Cl.
CPC .............. *B62K 21/06* (2013.01); *B62K 19/32* (2013.01); *B62K 21/02* (2013.01)

(58) Field of Classification Search
CPC ................................ B62K 19/32; B62K 21/06
USPC ........................................................ 280/279
See application file for complete search history.

(56) References Cited

U.S. PATENT DOCUMENTS

| | | | |
|---|---|---|---|
| 3,866,946 A | 2/1975 | Robinson | |
| 4,700,963 A | 10/1987 | Burns | |
| 10,351,204 B2 * | 7/2019 | Pazzaglia | B62K 21/22 |
| 2021/0362798 A1 * | 11/2021 | Robinson | B62K 21/06 |

FOREIGN PATENT DOCUMENTS

| | | | | |
|---|---|---|---|---|
| DE | 102011086127 A1 * | 5/2013 | ............ | B62K 21/06 |
| DE | 102013106889 A1 | 1/2015 | | |
| DE | 102013019566 A1 | 5/2015 | | |
| DE | 102017119483 A1 * | 2/2019 | | |
| EP | 2848505 A1 | 3/2015 | | |
| ES | 2681999 A1 * | 9/2018 | ............ | B62K 21/06 |
| JP | 6329070 A | 11/1994 | | |

* cited by examiner

*Primary Examiner* — Jacob B Meyer
*Assistant Examiner* — Hosam Shabara (57) ABSTRACT

A system for manipulating the steering axis angle of an object is provided. The system is beneficial for improving performance and enjoyability of use for objects employing a steering axis, including bicycles, toys, tools, sporting goods, and other modes of transportation. The system includes a reversible bearing plate with a bearing plate bore that permits passage of a steerer tube through a head tube when reversible bearing plates are installed at the head tube ends. The bearing plate bore may be at the center of the reversible bearing plate to maintain a steering axis coaxial with the head tube central axis. The bearing plate bore may be offset from the center of the reversible bearing plate and may employ an angled annular space such that when reversible bearing plates are installed oppositely at the head tube ends, the steering axis is offset from the center of each reversible bearing plate generating an angle between the steerer tube central axis and the head tube central axis, resulting in a correspondingly steeper or slacker head angle. Methods of employing reversible bearing plates for maintaining, steepening, or slackening the head angle of a bicycle are provided.

5 Claims, 7 Drawing Sheets

QUICK-FLIP BICYCLE HEADTUBE COMPONENT

CROSS-REFERENCE TO RELATED APPLICATIONS

This application claims priority to U.S. Provisional Patent Application Ser. No. 62/739,867, titled "Quick-Flip Bicycle Headtube Component," filed Oct. 2, 2018, which is hereby incorporated by reference.

BACKGROUND OF THE INVENTION

Field of the Invention

The present invention is directed generally to methods and components for changing the steering axis angle of an object. More particularly, the present invention is directed to a steering system employing within a bicycle head tube a pair of reversible bearing plates that fixes a passing steerer tube in the desired position optimal for performance and recreational riding.

The present invention is designed for bicycles, but may be used for toys, tools, sporting goods, and other modes of transportation.

Technology in the Field of the Invention

Bicycle geometry refers generally to the collection of angles formed between and among bicycle components, namely the frame, wheels, brackets, fork, seatpost, and wheels, and their relationships to the horizontal or vertical. Various measurements defining the overall geometry include head angle, fork rake, fork trail, chainstay length, wheelbase length, bottom bracket drop, seat tube angle, seat tube length, and top tube length. These measurements define not only the geometry, and thus the riding characteristics of the bicycle, but also the fit and suitability of purpose for any given individual.

A steering axis is the axis about which the steering apparatus pivots, and the steering axis angle is the angle between the steering axis and the horizontal. In bicycles, the head angle is the steering axis angle and is defined as the angle between the steering axis, namely the steerer tube (also known as the fork column), and the horizontal. Thus, a 90-degree head angle is equivalent to a vertical steerer tube that is perpendicular to the horizontal.

Head angles vary between bicycles designed for varied purposes. A "slacker" angle, as the term is used in the industry, is one in which the head angle is smaller. The more acute, slacker angle between the steerer tube and the horizontal results in increased bicycle stability, but also results in less responsive steering requiring more effort to steer at moderate to high speeds. Conversely, a "steeper" angle, as the term is used in the industry, is one in which the head angle is larger. The less acute, steeper angle between the steerer tube and the horizontal results in decreased bicycle stability, but also results in more responsive steering requiring less effort to maneuver. A steeper angle is preferred in road bike style racing for increased maneuverability, whereas a slacker angle is preferred in road bike touring and mountain biking for increased stability. For touring, the slacker angle may increase comfort without sacrifice where long stretches require little steering and rapid variation; for mountain biking, the slacker angle may increase stability without sacrifice where a primary concern in safety and stability over difficult terrain.

Typical mountain bike head angles range from 71.5 to 74.5 degrees, though newer mountain bikes exhibit slack head angles of 66 degrees. Downhill mountain bikes, such as the Mojo/Nicolai GeoMetron, are designed for riding downhill over steep terrain and exhibit a head angle of 62 degrees. The 12.5 degree difference between a 62 degree slack head angle and a 74.5 degree steep head angle is substantial with respect to suitability and purpose. An experienced rider may prefer a slack angle for some terrain or purposes, as in downhill racing along a generally straight line, and a steep angle for others, as in navigating turns such as switchbacks.

Unfortunately, current systems either require the rider use bikes with different head angles for different purposes, or alter other bicycle geometries by introducing more components. For instance, in downhill mountain bikes offset bushings may be placed in the rear shock absorber to slacken the head angle, but this addition impacts bicycle geometry by affecting the bottom bracket height and seat angle. Furthermore, this system may only be employed on bikes with rear suspension, cannot steepen the head angle, and introduces the risk that the tire may contact the seat tube when the shock is under full compression. Angle headsets may be used to change the head angle at the head tube by inserting offset cups and gimbals into the head tube prior to bearing installation, but this is a multi-component system with more moving parts prone to fouling.

A novel system is thus introduced for quickly and simply adjusting the head angle of a bicycle, in particular a mountain bike, for better and more varied performance and enjoyability.

BRIEF SUMMARY OF THE INVENTION

In a preferred embodiment of the present invention, a head tube apparatus employing a reversible bearing plate permits rapid reversal of bearing plates to slacken or steepen a bicycle's head angle either by fitting within an existing bicycle head tube design or by incorporation into new bicycle head tube designs.

BRIEF DESCRIPTION OF THE DRAWINGS

The unique attributes of the head tube apparatus are presented in detailed embodiments below. Chiefly, the apparatus described in this application is designed to provide an individual with the ability to modify a bicycle head angle for suitability and fitness of purpose. In using the invention, an individual simply disassembles and reassembles a few key bicycle headset components with the aid of hex wrench, as described in further detail below.

FIG. 3B presents a cross-sectional view of the reversible bearing plate depicted in

FIG. 3A.

DETAILED DESCRIPTION OF CERTAIN EMBODIMENTS

Figure 1:
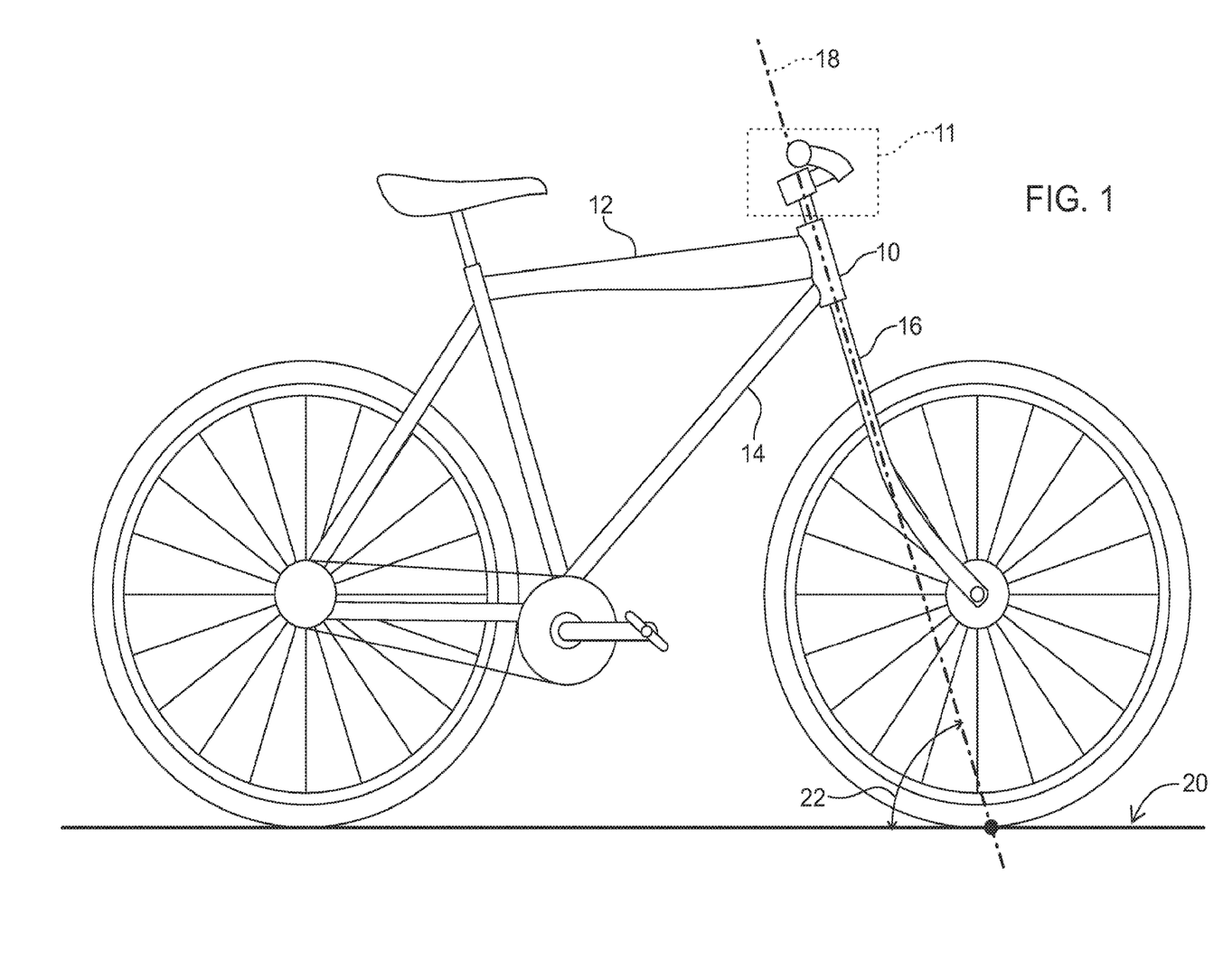
FIG. 1 presents a right-side view of a bicycle. The bicycle depiction is not particular to any sport or style, and is used for general reference only.

As depicted in FIG. 1, a bicycle head tube 10 connects the upper frame part 12 and lower frame part 14 and provides a bore through which a steerer tube 50 passes to join the steering apparatus 11 with the fork 16 along the steering axis 18. The head angle 22 is the angle between the steering axis 18 and the horizontal 20. In a first preferred embodiment, the head tube 10 is oval in nature and the major axis of the head tube oval is parallel to the plane of the bicycle frame.

Figure 2:
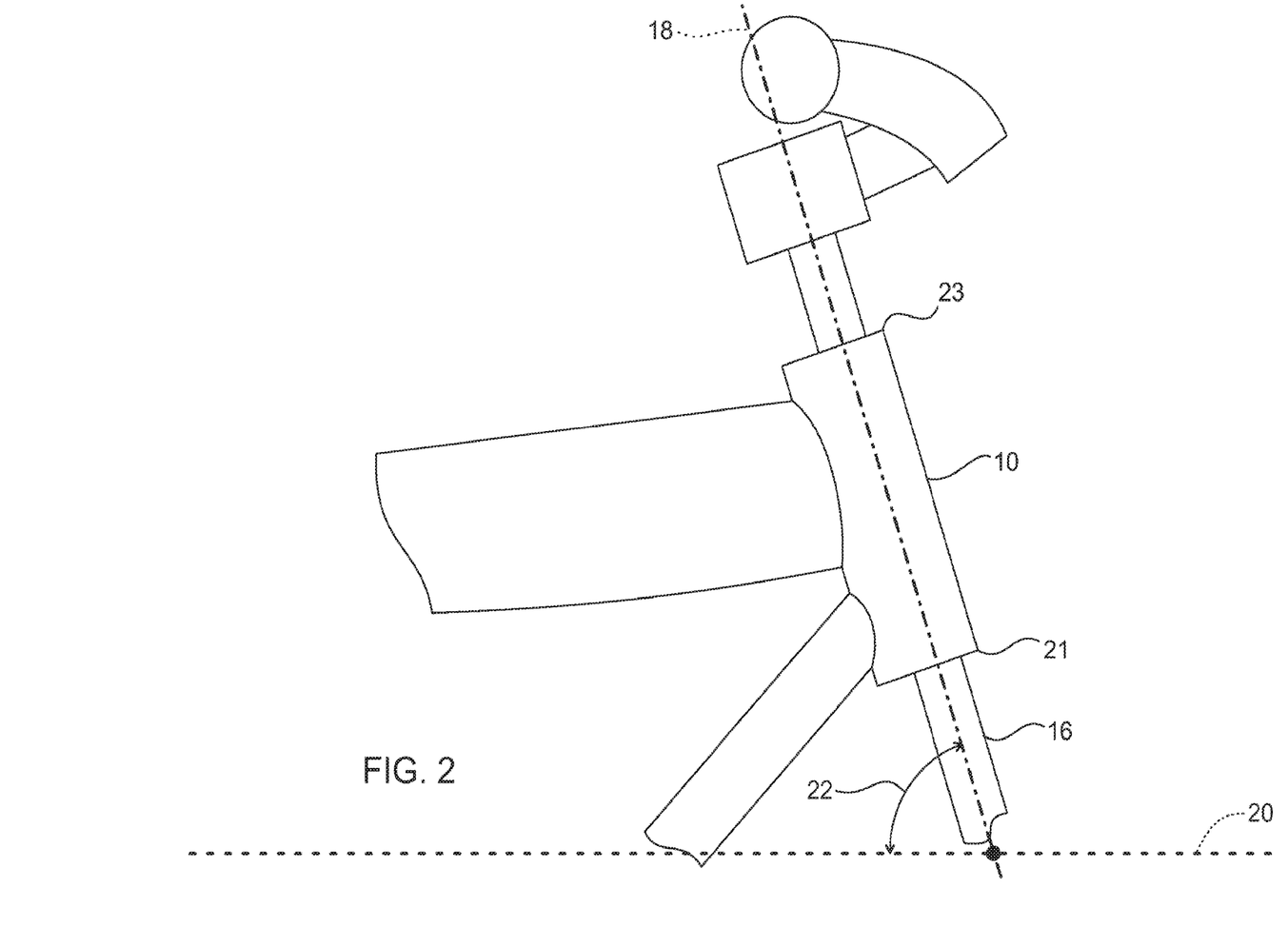
FIG. 2 presents an expanded view of the bicycle front end and connected bicycle components of FIG. 1 above.

In an expanded view in FIG. 2, it is observable that in a preferred embodiment the bicycle head tube 10 is not perpendicular to the horizontal 20, but is angled with the head tube bottom 21 farther toward the front of the bicycle than the head tube top 23, extending the fork 16 and steering axis 18 toward the front of the bicycle, establishing the head angle 22. While the head tube 10 is fixed to the frame, the head angle 22 can be slackened or steepened by incorporating the head tube apparatus of the present invention, thus affecting various ride characteristics such as stability and maneuverability.

Figure 3A:
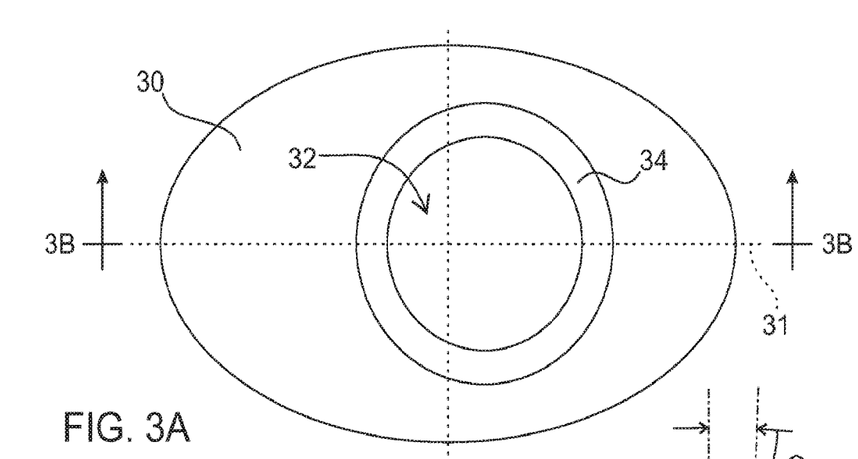
FIG. 3A presents a top plan view of a reversible bearing plate employed in the head tube apparatus of the present invention.

In FIG. 3, a top plan view of an oval reversible bearing plate 30 is depicted. In this preferred embodiment, a bearing plate bore 32 is positioned off-center along the bearing plate major axis 31, to permit passage of the steerer tube 50 connected to and coaxial with the fork 16 such that the steerer tube central axis 33 does not pass through the center of the ovate reversible bearing plate 30, but passes through off-center along the bearing plate major axis 31.

Figure 3B:
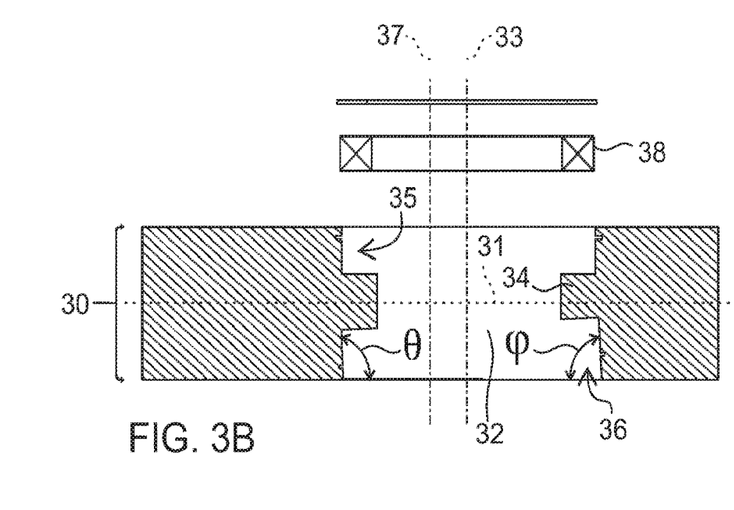

In FIG. 3B, a cross-sectional view of the reversible bearing plate 30 is presented. In a first preferred embodiment, the bearing plate bore 32 incorporates an annular protrusion 34. On a first side of the annular protrusion 34 a bearing 38 may be inserted into a first annular space 35 to encircle the steerer tube 50 in order to reduce mechanical friction as the steerer tube 50 pivots around its steerer tube central axis 33. In this orientation, the reversible bearing plate 30 positions the steerer tube central axis 33 parallel to the head tube central axis 37. On the second side of the annular protrusion 34 a second annular space 36 is angled, generating angle φ with respect to the reversible bearing plate 30 surface at the intersection of the second annular space 36 and the bearing plate major axis 31, and generating angle θ with respect to the reversible bearing plate 30 surface at the opposite intersection of the second annular space 36 and the bearing plate major axis 31, wherein the sum of angles φ and θ is by necessity 180 degrees.

Figure 3C:
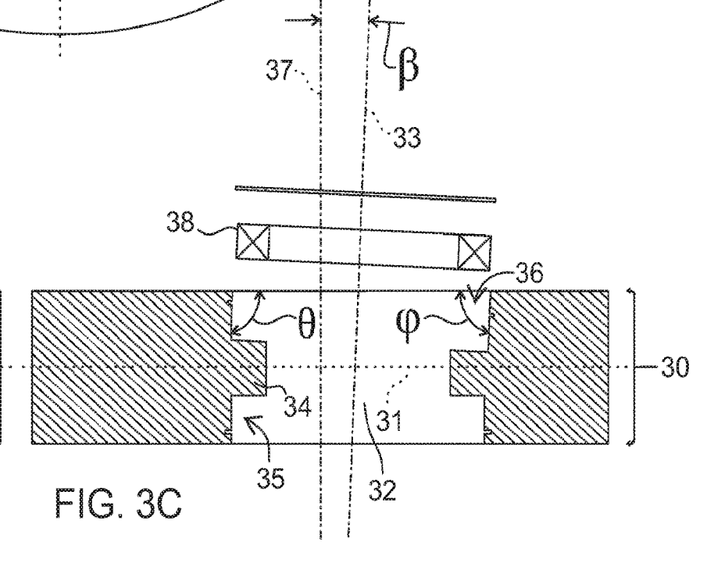
FIG. 3C presents a cross-sectional view of the reversible bearing plate depicted in FIB. 3A in a position rotated 180 degrees around the bearing plate major axis with respect to FIG. 3B.

In FIG. 3C, a second cross-sectional view of the reversible bearing plate 30 is presented. Here, the bearing plate 30 is depicted rotated 180 degrees around the bearing plate major axis 31 with respect to FIG. 3B. In this orientation, the second side of the annular protrusion 34 is positioned to receive the bearing 38 inserted into the second annular space 36 to position the steerer tube central axis 33 perpendicular to the bearing 38 and at angle β with respect to the head tube central axis 37.

Figure 4:
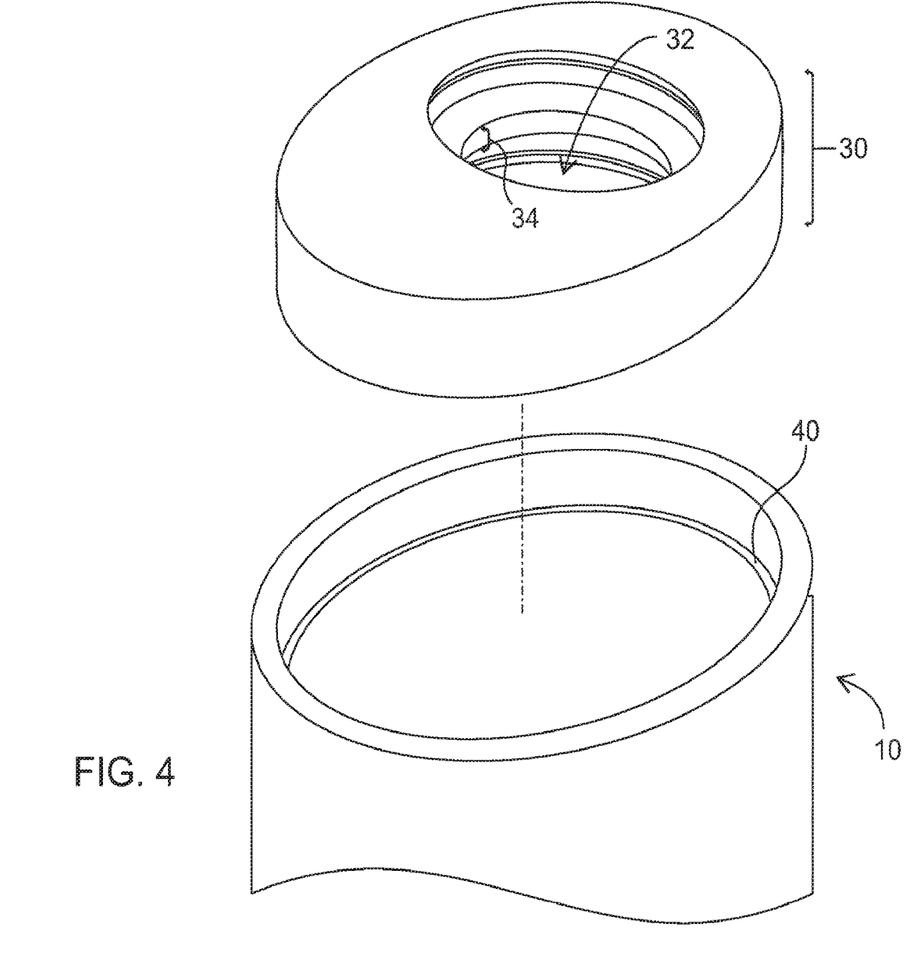
FIG. 4 presents a perspective view of the reversible bearing plate fitting into the bicycle head tube in isolation from other components.

In FIG. 4, a perspective view of the reversible bearing plate 30 as it fits into the bicycle head tube 10 is presented. The ovate reversible bearing plate 30 fits into the ovate head tube 10 and rests upon a shelf 40 formed by a material extension of or distinct attachment to the interior of the head tube 10.

Figure 5:
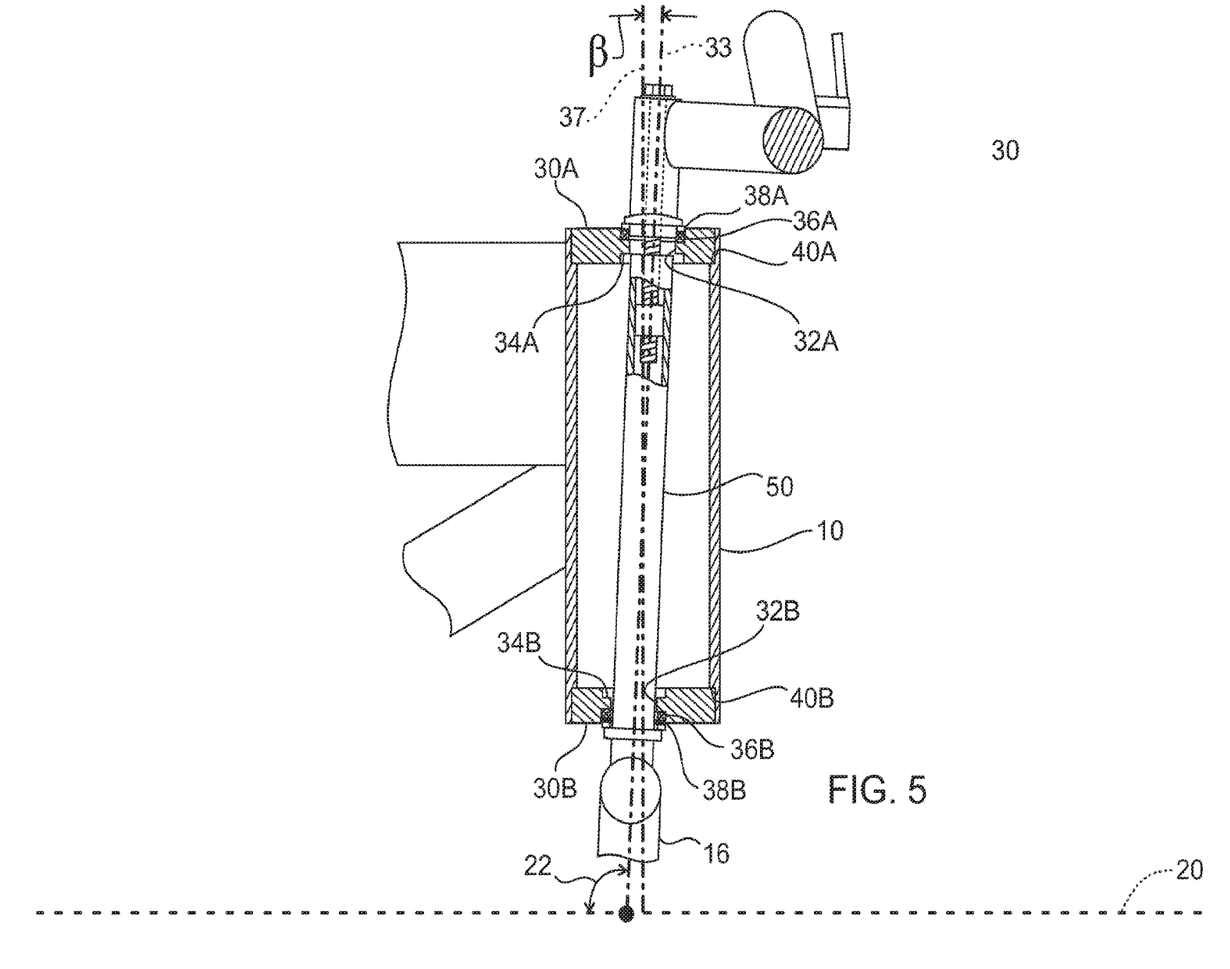
FIG. 5 presents a right-side and cross-sectional view of the head tube apparatus in which reversible bearing plates are oppositely positioned at the top and bottom of the head tube so that a passing steerer tube remains in plane with the bicycle frame but is angled with respect to the head tube central axis, generating an angle between the steerer tube central axis and the head tube central axis, resulting in a head angle correspondingly steeper by said angle.

In FIG. 5, a cross-sectional view of the head tube apparatus is presented. For simplicity, the head tube 10 is illustrated vertically; in practical implementation, the head tube 10 will be angled with respect to the horizontal 20 as depicted in FIG. 1 and FIG. 2. This figure depicts an upper reversible bearing plate 30A positioned with a bearing plate bore 32A off-center along the bearing plate major axis with respect to the head tube central axis 37; the reversible bearing plate 30A is inserted into the top of head tube 10 and nested in an upper shelf 40A such that a bearing 38A fits inside a second annular space 36A above an annular protrusion 34A. This configuration permits passage of the steerer tube 50 through the bearing plate bore 32A in a manner angled toward the back of the bicycle with respect to the head tube central axis 37 in the plane of the bicycle frame. The steerer tube 50 extends downwards to the opposite or lower reversible bearing plate 30B, which is rotated 180 degrees with respect to the upper reversible bearing plate 30A around both the major bearing plate axis and around the head tube central axis 37 so that a bearing plate bore 32B is off-center along the bearing plate major axis with respect to the head tube central axis 37 and a second annular space 36B is facing down; the reversible bearing plate 30B is inserted into the bottom of head tube 10 and nested in a lower shelf 40B. This orientation permits insertion of a bearing 38B into the second annular space 36B below an annular protrusion 34B. For avoidance of doubt, the upper reversible bearing plate 30A is positioned with its off-center bearing plate bore 32A towards the front of the bike in the plane of the frame, whereas the lower reversible bearing plate 30B is positioned with its off-center bearing plate bore 32B towards the back of the bike in the plane of the frame, both reversible bearing plates oriented so that their respective angled annular spaces are facing away from head tube 10. In this configuration of the head tube apparatus, the steerer tube central axis 33 is at angle β with respect to the head tube central axis 37 in the plane of the bicycle frame, generating a steeper head angle 22.

Figure 6A:
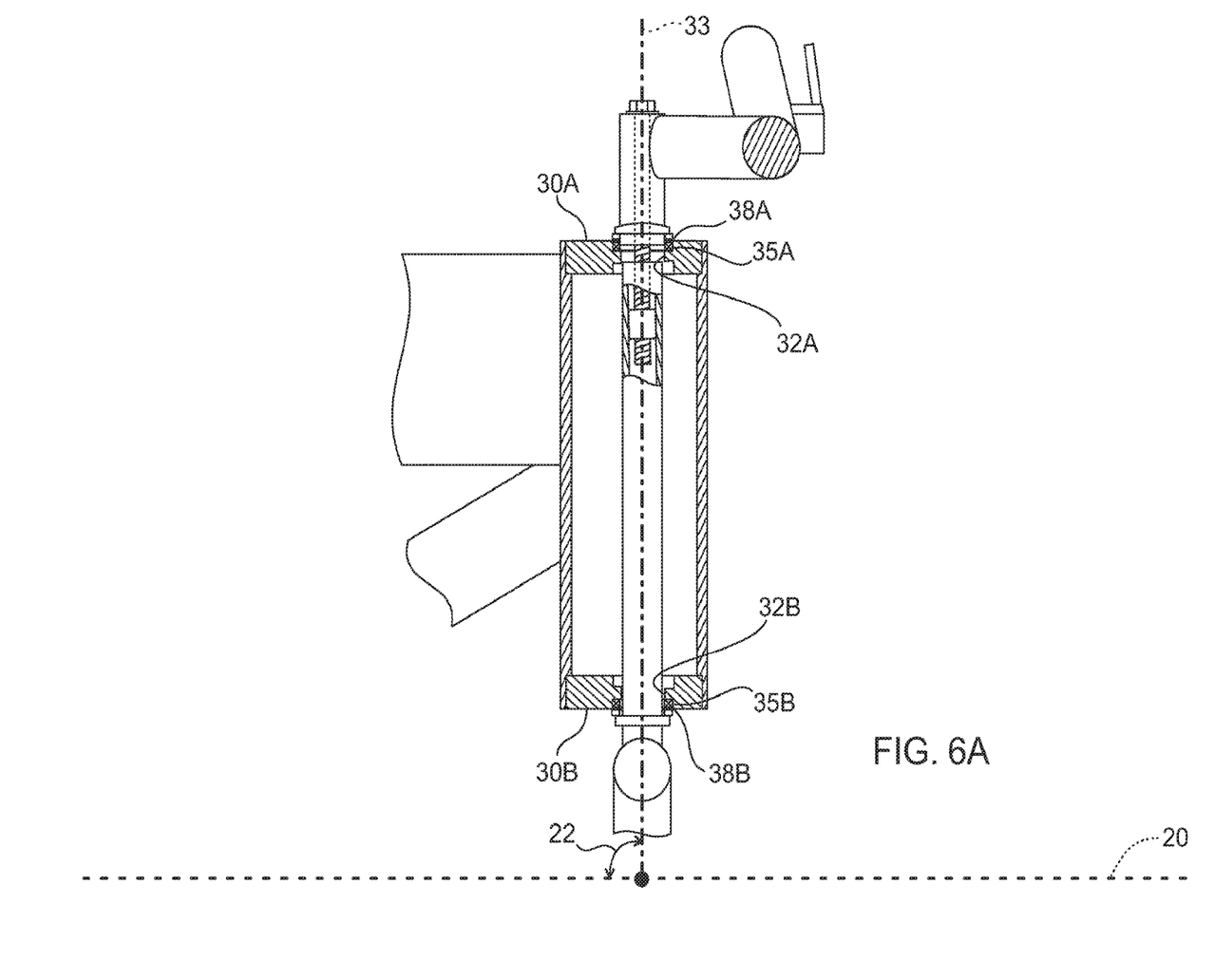
FIG. 6A presents a right-side and cross-sectional view of the head tube apparatus in which both reversible bearing plates positioned at the top and bottom of the head tube are rotated 180 degrees around their respective bearing plate major axes with respect to FIG. 5, and the lower reversible bearing plate is also rotated 180 degrees around the head tube central axis with respect to FIG. 5 so that a passing steerer tube remains in plane with the bicycle frame, is off-center with respect to the head tube central axis, but remains parallel to the head tube central axis, resulting in a head angle unchanged from the angle between the head tube central axis and the horizontal.

In FIG. 6A, a cross-sectional view of the head tube apparatus is presented, and for simplicity the head tube 10 is again illustrated vertically. The upper reversible bearing plate 30A and the lower reversible bearing plate 30B are oriented so that their off-center bearing plate bores, 32A and 32B respectively, share a vertical axis. Additionally, each reversible bearing plate is positioned so that their first annular spaces, 35A and 35B respectively, are facing away from head tube 10. This orientation permits insertion of bearing 38A into the first annular space 35A and insertion of bearing 38B into the first annular space 35B so the bearings are planar to the head tube 10 major and minor axes, allowing passage of steerer tube 50 through head tube 10 such that the steerer tube central axis 33 is vertical. In this configuration of the head tube apparatus, the head angle 22 is unchanged with respect to the angle between the head tube central axis 37 and the horizontal 20.

Figure 6B:
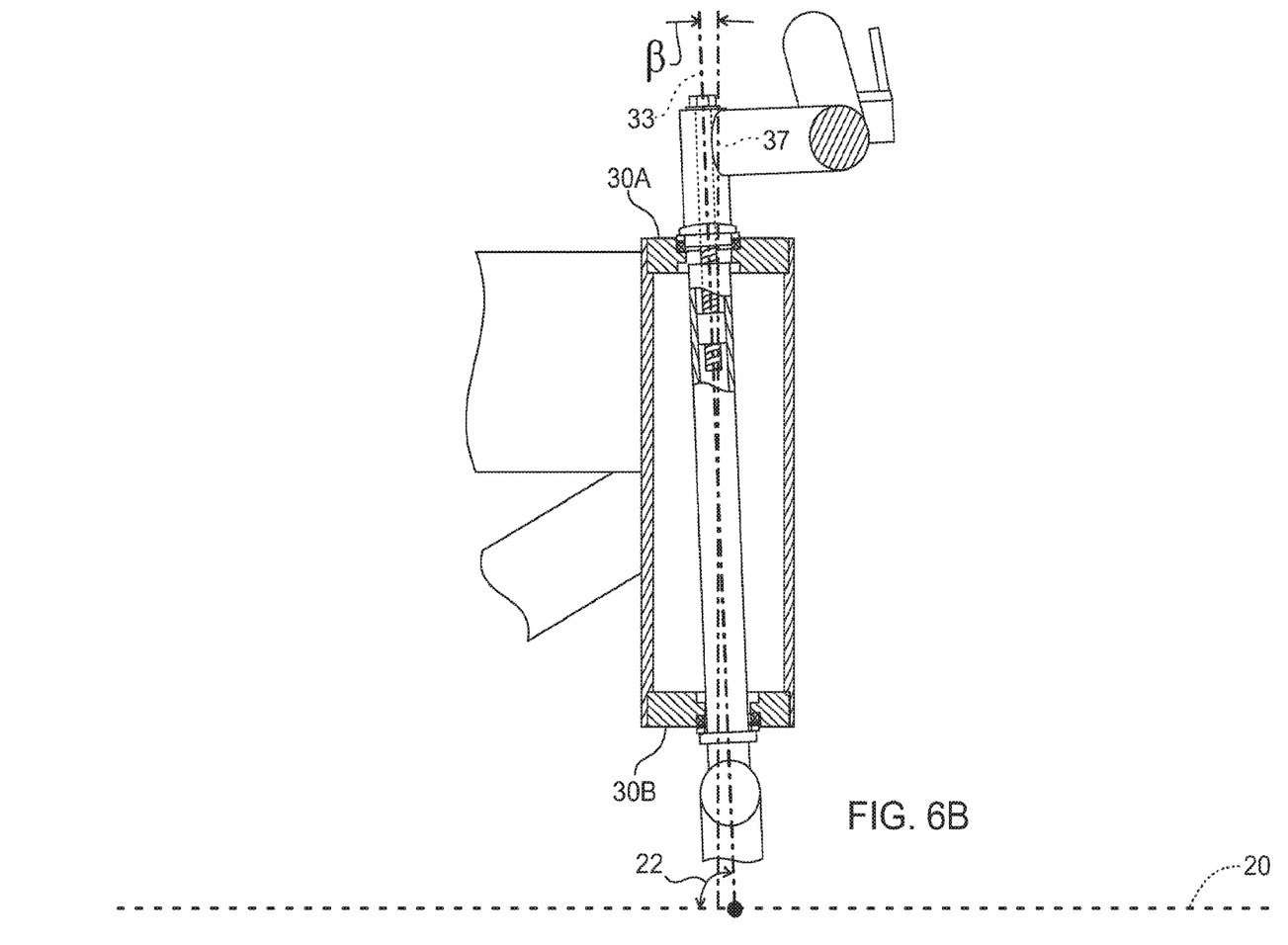
FIG. 6B presents a right-side and cross-sectional view of the head tube apparatus in which both reversible bearing plates are rotated 180 degrees around the head tube central axis with respect to FIG. 5 so that a passing steerer tube remains in plane with the bicycle frame but is angled with respect to the head tube central axis, generating an angle between the steerer tube central axis and the head tube central axis, resulting in a head angle correspondingly slacker by said angle.

In FIG. 6B, a cross-sectional view of the head tube apparatus is presented, and for simplicity the head tube 10 is again illustrated vertically. This figure depicts both the upper reversible bearing plate 30A and the lower reversible bearing plate 30B rotated 180 degrees around the head tube central axis 37 with respect to FIG. 5. In this configuration of the head tube apparatus, the steerer tube central axis 33 is at angle β with respect to the head tube central axis 37 in the plane of the bicycle frame, generating a slacker head angle 22.

In a preferred use of the invention, a cyclist desiring to slacken or steepen his or her head angle 22 would remove the top cap screw and stem bolts (not pictured) securing the steering apparatus 11 to the head tube 10. With the steering apparatus 11, steerer tube 50, and fork 16 detached from the head tube 10, both the upper reversible bearing plate 30A and the lower reversible bearing plate 30B may be rotated 180 degrees around the head tube central axis 37 or their respective bearing plate major axes to manipulate the head angle 22. The entire adjustment process should take a few minutes or less.

I claim:

1. A head tube apparatus for manipulating a steering axis angle in a bicycle head tube, the apparatus comprising:
    a reversible bearing plate comprising a first side, a second side opposite the first side, and a bearing plate bore;
    wherein the reversible bearing plate further comprises an annular protrusion situated within the bearing plate bore, a first annular space between the annular protrusion and the first side, and a second annular space between the annular protrusion and the second side;
    wherein a pair of the reversible bearing plates are employed together as components of a headset
    wherein the bearing plate bore is offset from the center of the reversible bearing plate by an offset distance, and the second annular space is angled with respect to the second side
    wherein the reversible bearing plate is ovate and the offset distance is along the major axis.

2. A head tube apparatus for manipulating a steering axis angle in a bicycle head tube, the apparatus comprising:
    a reversible bearing plate comprising a first side, a second side opposite the first side, and a bearing plate bore;
    wherein the reversible bearing plate further comprises an annular protrusion situated within the bearing plate bore, a first annular space between the annular protrusion and the first side, and a second annular space between the annular protrusion and the second side;
    wherein a pair of the reversible bearing plates are employed together as components of a headset
    wherein the bearing plate bore is offset from the center of the reversible bearing plate by an offset distance, and the second annular space is angled with respect to the second side
    wherein the reversible bearing plate is circular, the offset distance is parallel to the plane formed by the steering axis angle, and installation of the reversible bearing plate into the head tube employs an indentation that aligns with a protrusion.

3. A method for changing the steering axis of a bicycle, comprising: providing a head tube apparatus for manipulating a steering axis angle in a bicycle head tube to a user, the head tube apparatus comprising: a reversible bearing plate comprising a first side, a second side opposite the first side, and a bearing plate bore: wherein the reversible bearing plate further comprises an annular protrusion situated within the bearing plate bore, a first annular space between the annular protrusion and the first side, and a second annular space between the annular protrusion and the second side; installing a first reversible bearing plate in a first head tube end as a component of a headset, installing a second reversible bearing plate in a second head tube end as a component of a headset, wherein the bearing plate bores of both the first reversible bearing plate and the second reversible bearing plate are offset from the centers of their respective reversible bearing plates by an offset distance, the second annular spaces of both the first reversible bearing plate and the second reversible bearing plate are angled with respect to their respective second sides, the second sides of both the first reversible bearing plate and the second reversible bearing plate are facing away from the head tube, and the bearing plate bore of the first reversible bearing plate is situated oppositely in the head tube with respect to the bearing plate bore of the second reversible bearing plate in the plane formed by the steering axis angle.

4. The method of claim 3, wherein the reversible bearing plates are ovate and their respective offset distances are along the major axis.

5. The method of claim 3, wherein the reversible bearing plates are circular, the offset distance of each reversible bearing plate is parallel to the plane formed by the steering axis angle, and installation of each reversible bearing plate into the head tube employs an indentation that aligns with a protrusion.

* * * * *